(12) United States Patent
Rouby et al.

(10) Patent No.: US 10,279,566 B2
(45) Date of Patent: May 7, 2019

(54) LAMINATE OF A THICK POLYMER MATERIAL SHEET AND OF A THIN GLASS SHEET

(71) Applicant: SAINT-GOBAIN GLASS FRANCE, Courbevoie (FR)

(72) Inventors: Michel Rouby, Bray en Val (FR); Pierre Chaussade, Orléans (FR); Gregoire Mathey, Le Vesinet (FR); Catherine Descusse, Chateauneuf sur Loire (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 138 days.

(21) Appl. No.: 15/534,842

(22) PCT Filed: Dec. 8, 2015

(86) PCT No.: PCT/FR2015/053367
§ 371 (c)(1),
(2) Date: Jun. 9, 2017

(87) PCT Pub. No.: WO2016/092196
PCT Pub. Date: Jun. 16, 2016

(65) Prior Publication Data
US 2017/0341344 A1    Nov. 30, 2017

(30) Foreign Application Priority Data
Dec. 11, 2014 (FR) ..................... 14 62264

(51) Int. Cl.
*B32B 17/10*    (2006.01)
(52) U.S. Cl.
CPC .... *B32B 17/10018* (2013.01); *B32B 17/1077* (2013.01); *B32B 17/10743* (2013.01); *B32B 17/10761* (2013.01); *B32B 17/10788* (2013.01); *B32B 2333/12* (2013.01); *B32B 2369/00* (2013.01)
(58) Field of Classification Search
None
See application file for complete search history.

(56) References Cited

U.S. PATENT DOCUMENTS

| | | | |
|---|---|---|---|
| 5,589,272 A | 12/1996 | Braun et al. | |
| 5,919,689 A * | 7/1999 | Selvig | C04B 24/14 106/14.22 |
| 6,699,501 B1 * | 3/2004 | Neu | A61K 9/5089 424/450 |
| 2004/0024076 A1 * | 2/2004 | Davis | B82Y 30/00 521/154 |
| 2004/0116408 A1 * | 6/2004 | Serhan | C07C 59/42 514/218 |
| 2009/0246517 A1 | 10/2009 | Hatta | |
| 2011/0014472 A1 * | 1/2011 | Culver | B22F 1/0018 428/403 |
| 2013/0059123 A1 * | 3/2013 | Wang | C12N 7/00 428/164 |

FOREIGN PATENT DOCUMENTS

DE    44 15 878 A1    11/1995
FR    2 750 075 A1    12/1997

OTHER PUBLICATIONS

International Search Report as issued in International Patent Application No. PCT/FR2015/053367, dated Mar. 14, 2016.
"Cooler is Better," Huntsman, Jan. 2006, XP055218864, Retrieved from the Internet: URL:http://www.huntsman.comjpolyurethanes/Media Library/aMC1CD1F5AB7BB1738E040EBCD2B6B01F1/Products_MC1CD1F5AB8081738E040EBCD2B6B01F1/TPU_former_MC1CD1F5B17601738E040EBCD2B6B01F1/Welcome to the world_MC1CD1F5B17AD1738E040EBCD2B6B01F1/Brands_MC1CD1F5B180E1738E040EBCD2B6B01F1/Krystalflex_MC1CD1F5B185B173 [retrieved on Oct. 7, 2015], 8 pages.

* cited by examiner

*Primary Examiner* — Peter A Salamon
(74) *Attorney, Agent, or Firm* — Pillsbury Winthrop Shaw Pittman LLP

(57) ABSTRACT

A glazing includes a transparent polymer material sheet having a thickness of from 5 to 25 mm and a glass sheet having a thickness of between 0.5 and 1.5 mm, which are bonded to one another by an adhesive interlayer, the hardness of which at a temperature at least equal to −5° C. is at most equal to 70 Shore A and the thickness of which is a decreasing function of the thickness of the glass sheet, an adhesive interlayer thickness of 2.5 mm being sufficient for a glass sheet thickness of 0.55 mm and an adhesive interlayer thickness of 1.25 mm being sufficient for a glass sheet thickness of 1.25 mm.

15 Claims, No Drawings

LAMINATE OF A THICK POLYMER MATERIAL SHEET AND OF A THIN GLASS SHEET

CROSS-REFERENCE TO RELATED APPLICATIONS

This application is the U.S. National Stage of PCT/FR2015/053367, filed Dec. 8, 2015, which in turn claims priority to French patent application number 1462264 filed Dec. 11, 2014. The content of these applications are incorporated herein by reference in their entireties.

The invention relates to laminated glazings consisting of a thick transparent polymer material sheet and a thin mineral glass sheet, which are bonded to one another by an adhesive interlayer.

The specific problem posed by this type of structure is that of the differential thermal expansion between the polymer material and the mineral glass at the temperatures for assembling the laminates, referred to as a bimaterial strip effect. The polymer material sheet is bonded to the glass sheet by means of a thermoplastic adhesive. The bonding requires heating from ambient temperature to 100-120° C. depending on the nature of the polymer material, and preferably to a temperature slightly above 80° C., then cooling to ambient temperature. During cooling, the polymer material shrinks much more than the thin glass which then has a tendency to deform by forming ripples: this is also referred to as hillocking. The optical quality of the laminate is of course seriously affected thereby.

The inventors have realised that the choice of the nature and of the thickness of the adhesive interlayer made it possible, in very rare cases, to eliminate hillocking.

This objective was therefore able to be achieved by the invention, one subject of which is consequently a glazing essentially consisting of a transparent polymer material sheet having a thickness of from 5 to 25 mm and a glass sheet having a thickness of between 0.5 and 1.5 mm, which are bonded to one another by an adhesive interlayer, the hardness of which at a temperature at least equal to −5° C. is at most equal to 70 Shore A and the thickness of which is a decreasing function of the thickness of the glass sheet, an adhesive interlayer thickness of 2.5 mm being sufficient for a glass sheet thickness of 0.55 mm and an adhesive interlayer thickness of 1.25 mm being sufficient for a glass sheet thickness of 1.25 mm.

Within the meaning of the invention, glass is understood to mean any type of mineral glass such as soda-lime float glass which is optionally chemically strengthened, aluminosilicate glass which is optionally chemically strengthened, with or without alkali metals, borosilicate glass, aluminoborosilicate glass, etc.

Owing to the low hardness level and the considerable thickness of the adhesive layer according to the invention, a perfectly even, ripple-free surface of glass sheets as thin as 0.5 mm thick, laminated with the thick sheet of polymer material, is benefited from.

Without difficulty, it is also possible to obtain the customary qualities required for glazings in demanding applications such as aeronautics, in particular resistance to ambient usage temperatures as low as −40° C., bird strike resistance, indentation—gravel impact resistance, scratch resistance, etc.

The threshold of −5° C. for determining the hardness corresponds substantially to the minimum temperature reached by the adhesive interlayer in the presence of glazing with a heating layer.

According to preferred features of the glazing of the invention:
   the transparent polymer material is selected from poly (methyl methacrylate) and polycarbonate;
   the thickness of the glass sheet is at most equal to 1.4 mm and, in order of increasing preference, 1.3, 1.2, 1.1 and 1.0 mm;
   the thickness of the transparent polymer material sheet is at most equal to 20 mm and, in order of increasing preference, 15 and 12 mm;
   the face of the glass sheet oriented toward the adhesive interlayer bears a heating layer; one example thereof is a 200 nm thick layer of indium tin oxide (ITO or else tin-doped indium oxide), which is a mixed oxide or a mixture obtained from oxides of indium (III) ($In_2O_3$) and of tin (IV) ($SnO_2$), preferably in weight proportions of between 70% and 95% for the first oxide and 5% to 20% for the second oxide; a typical weight proportion is around 90% by weight of $In_2O_3$ to around 10% by weight of $SnO_2$; owing to the relatively small thickness of the glass sheet, the heating power may be reduced relative to that which would be required by thermal conduction through a thicker glass sheet, frequently having a thickness of 3 mm for example;
   the adhesive interlayer(s) is (are) selected from thermoplastic polyurethane, polyvinyl butyral, ethylene/vinyl acetate and a resin such as an ionomer resin; they may provide functionalities such as acoustic insulation, increased mechanical strength, especially ballistic resistance, etc.;
   said transparent polymer material sheet is monolithic or consists of several plies laminated together.

One subject of the invention is moreover the application of a glazing as described above for a terrestrial, airborne or water-borne transport vehicle, the surface of which in contact with the external atmosphere consists of one said glass sheet. This glass sheet offers an excellent mechanical resistance, with respect to scratches and indentations, and protects the surface of the underlying transparent polymer material. It guarantees the preservation of the original visual appearance of the surface of the glazing, which is essentially free of marks, and the maintaining of excellent optical and transparency quality.

The invention will be better understood in light of the following example.

EXAMPLE

A 9 mm thick sheet of poly(methyl methacrylate) is bonded to a 0.55 mm or 1.25 mm thick sheet of soda-lime-silica float glass chemically strengthened by an adhesive interlayer having a thickness of 1.25 mm or 2.5 mm consisting of polyvinyl butyral which is compatible with the PMMA, sold by Saflex under the registered trademark Saflex® PVB DB, or of thermoplastic polyurethane sold by Huntsman under the registered trademark Krystalflex® PE 499.

At 20° C., the hardness of Saflex® PVB DB is 95 Shore A and that of the Krystalflex® PE 499 TPU is 65 Shore A.

Six laminated glazings are assembled, having the features recorded in the table below.

| Sample no. | Thickness of glass mm | Thickness of PVB mm | Thickness of TPU mm | Thickness of PMMA mm |
|---|---|---|---|---|
| 1 | 0.55 | 1.25 | 0 | 9 |
| 2 | 0.55 | 0 | 1.25 | 9 |
| 3 | 0.55 | 2.5 | 0 | 9 |

| Sample no. | Thickness of glass mm | Thickness of PVB mm | Thickness of TPU mm | Thickness of PMMA mm |
|---|---|---|---|---|
| 4 | 0.55 | 0 | 2.5 | 9 |
| 5 | 1.25 | 1.25 | 0 | 9 |
| 6 | 1.25 | 0 | 1.25 | 9 |

These six laminates are subjected to the polarized light test (plane polariscope) which makes it possible to visualize the stresses in the laminate.

This test consists in exposing the sample to a source of polarized light and in observing the sample through a polarized filter.

The stress levels in the material are shown by the observation of color fringes known as isochromatics.

A zero stress level gives a black color; when the stress levels increase, the cold colors (blue, green) decrease in order to give way to hot colors (yellow, red).

An absence of stresses is only observed for the laminated glazings 4 and 6. It guarantees that the bimaterial strip effect described above does not occur, and that rippling of the thin glass sheets should not be expected for the laminated glazings 4 and 6. This is in accordance furthermore with direct visual observation through these glazings or using a shadow technique: specifically, no rippling is seen on the laminated glazings 4 and 6, unlike the other laminated glazings.

The invention claimed is:

1. A glazing essentially consisting of a transparent polymer material sheet having a thickness of from 5 to 25 mm and a glass sheet having a thickness of between 0.5 and 1.5 mm, which are bonded to one another by an adhesive interlayer, a hardness of the adhesive interlayer at a temperature at least equal to −5° C. is at most equal to 70 Shore A and a thickness of the adhesive interlayer is a decreasing function of a thickness of the glass sheet, an adhesive interlayer thickness of 2.5 mm being sufficient for a glass sheet thickness of 0.55 mm and an adhesive interlayer thickness of 1.25 mm being sufficient for a glass sheet thickness of 1.25 mm.

2. The glazing as claimed in claim 1, wherein the transparent polymer material is selected from poly(methyl methacrylate) and polycarbonate.

3. The glazing as claimed in claim 1, wherein the thickness of the glass sheet is at most equal to 1.4 mm.

4. The glazing as claimed in claim 3, wherein the thickness of the glass sheet is at most equal to 1.3 mm.

5. The glazing as claimed in claim 4, wherein the thickness of the glass sheet is at most equal to 1.2 mm.

6. The glazing as claimed in claim 5, wherein the thickness of the glass sheet is at most equal to 1.1 mm.

7. The glazing as claimed in claim 6, wherein the thickness of the glass sheet is at most equal to 1.0 mm.

8. The glazing as claimed in claim 1, wherein a thickness of the transparent polymer material sheet is at most equal to 20 mm.

9. The glazing as claimed in claim 8, wherein the thickness of the transparent polymer material sheet is at most equal to 15 mm.

10. The glazing as claimed in claim 9, wherein the thickness of the transparent polymer material sheet is at most equal to 12 mm.

11. The glazing as claimed in claim 1, wherein a face of the glass sheet oriented toward the adhesive interlayer bears a heating layer.

12. The glazing as claimed in claim 1, wherein the adhesive interlayer(s) is (are) selected from thermoplastic polyurethane, polyvinyl butyral, ethylene/vinyl acetate and a resin.

13. The glazing as claimed in claim 1, wherein said transparent polymer material sheet is monolithic or consists of several plies laminated together.

14. A method comprising mounting a glazing as claimed in claim 1 on a terrestrial, airborne or water-borne transport vehicle, a surface of which in contact with the external atmosphere consists of said glass sheet.

15. The glazing as claimed in claim 12, wherein the resin is an ionomer resin.

* * * * *